United States Patent
Tsui

(12) 
(10) Patent No.: US 6,256,559 B1
(45) Date of Patent: Jul. 3, 2001

(54) PASSIVE ALTIMETER EMPLOYING GPS SIGNALS

(75) Inventor: James B. Y. Tsui, Dayton, OH (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 0 days.

(21) Appl. No.: 09/524,372

(22) Filed: Mar. 13, 2000

(51) Int. Cl.$^7$ ................................................ G08B 23/00
(52) U.S. Cl. .............................. 701/4; 701/207; 701/208
(58) Field of Search ........................... 701/4, 5, 14, 207, 701/208, 213; 340/970, 977; 342/357.09, 357.13

(56) References Cited

U.S. PATENT DOCUMENTS

| | | | |
|---|---|---|---|
| 4,809,005 | 2/1989 | Counselman, III | 342/352 |
| 5,187,485 | 2/1993 | Tsui et al. | 342/357.08 |
| 5,450,329 | * 9/1995 | Tanner | 701/213 |
| 5,995,902 | 11/1999 | Monson | 701/202 |
| 5,995,903 | 11/1999 | Smith et al. | 701/211 |
| 6,005,513 | * 12/1999 | Hardesty | 342/357.09 |
| 6,011,510 | 1/2000 | Yee et al. | 342/357.09 |
| 6,012,013 | 1/2000 | McBurney | 701/207 |
| 6,014,608 | 1/2000 | Seo | 701/207 |
| 6,018,659 | 1/2000 | Ayyagari et al. | 455/431 |
| 6,020,832 | 2/2000 | Jensen | 340/970 |
| 6,021,374 | 2/2000 | Wood | 701/301 |
| 6,023,242 | 2/2000 | Dixon | 342/359 |

* cited by examiner

Primary Examiner—William A. Cuchlinski, Jr.
Assistant Examiner—Marthe Marc-Coleman
(74) Attorney, Agent, or Firm—Gerald B. Hollins; Thomas L. Kundert

(57) ABSTRACT

A passive radio frequency signal-enabled aircraft altimeter employing signals of one or more global position system satellites as a source of terrain illumination. The altimeter determines altitude of the host aircraft with respect to specific terrain features beneath the aircraft rather than an altitude above a mean or nominal level of the earth's surface—as is already provided in a global position system signal. The altimeter employs two signal paths between the global position system satellite and the host aircraft, one direct signal path and one earth-reflected signal path, together with elementary geometric/trigonometric relationships, involving length difference in these paths and signal angle of arrival, in determining aircraft altitude. Equal angles of satellite signal incidence and reflection at the point of satellite signal reflection from the earth is an enabling principle in the altimeter.

20 Claims, 3 Drawing Sheets

PASSIVE ALTIMETER EMPLOYING GPS SIGNALS

RIGHTS OF THE GOVERNMENT

The invention described herein may be manufactured and used by or for the Government of the United States for all governmental purposes without the payment of any royalty.

BACKGROUND OF THE INVENTION

This invention relates to the field of aircraft altitude determination as accomplished electronically from within the considered aircraft by a passive, non signal emitting and global positioning system signal-based technique.

The conventional radar altimeter transmits a radar signal from its host aircraft to the ground and processes a reflected or returned radar signal to determine the altitude of the host aircraft. A transmitted signal of this nature can, however, be detected by hostile persons to reveal the presence of the aircraft and to provide guidance for ordnance intended to intercept the aircraft. Similar non-atmospheric pressure altitude measuring arrangements based on electromagnetic energy of differing wavelengths including, for example, laser energy emissions are possible under some weather conditions but have the related disadvantages of being detectable and providing ordnance target identification. The present invention provides an uncomplicated measurement of aircraft altitude free of these signal emission and target identification disadvantages. The invention employs signals readily available in most parts of the world and makes additional use of some apparatus possibly already available on the host aircraft.

SUMMARY OF THE INVENTION

The present invention provides a passive, global positioning system signal-operated altitude determination for an aircraft. The invention uses the global positioning system signals received at a pair of locations on the host aircraft and signal processing based on ground reflection of one received signal together with simple geometric relationships between reflected and direct signals to determine the distance between the host aircraft and the earth.

It is an object of the present invention, therefore, to provide a passive electronic altimeter for an aircraft.

It is another object of the invention to provide a global positioning system signal operated aircraft altimeter.

It is another object of the invention to provide a non signal-emitting electronic altimeter for a military aircraft.

It is another object of the invention to provide an aircraft altimeter based on the relationship between directly incident and reflected global positioning system signals received from a satellite in earth orbit.

It is another object of the invention to provide a confirming non atmospheric pressure-related altitude determination for an aircraft.

It is another object of the invention to provide an accurate low-cost radio altimeter usable in a variety of large and small aircraft types.

It is another object of the invention to provide a global positioning system signal-enabled aircraft altimeter operable with either a single or a plurality of global positioning system signals.

Additional objects and features of the invention will be understood from the following description and claims and the accompanying drawings.

These and other objects of the invention are achieved by the combination of:

a host aircraft having first and second global positioning system signal reception antennas disposed on opposite extremities thereof, said first and second antennas having direct signal and earth-reflected signal reception capabilities respectively with respect to radio frequency signals originating in a global positioning system satellite;

radio frequency signal receiver apparatus connected with said first and second global positioning system signal reception antennas and generating output signals representing first and second samples of global positioning system data received from said global positioning system satellite via said first and second antennas respectively;

signal processing apparatus connected with said radio frequency signal receiver apparatus and generating, from said first and second samples of global positioning system data, first distance signals representative of direct physical distance between said aircraft first global positioning system signal reception antenna and said satellite and second distance signals representative of greater ground reflection-inclusive indirect physical distance between said aircraft second global position system signal reception antenna and said satellite;

said second distance signals representative of greater ground reflection-inclusive indirect physical distance between said aircraft second global positioning system signal reception antenna and said satellite including equal-angled incident and reflected signal paths to and from an earth point of satellite signal illumination attending said aircraft: and geometric algorithm signal processing apparatus generating from said first and second distance signals and angular relationships attending said equal-angled incident and reflected signal paths an aircraft altitude signal representative of orthogonal distance between said aircraft and a ground point below said aircraft.

DETAILED DESCRIPTION

Figure 1:
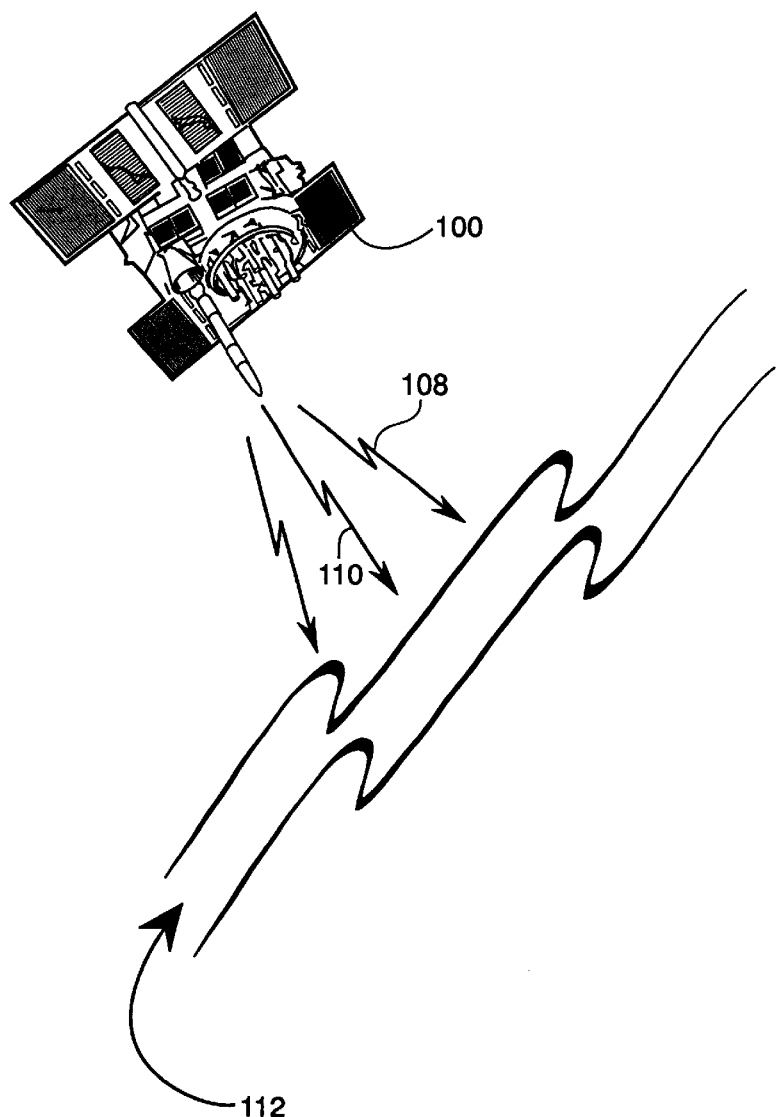
FIG. 1 shows a representation of signal source and signal receiving apparatus, i.e., a satellite and an aircraft, relevant to the present invention.

FIG. 1 in the drawings shows the major components of the present invention altimeter system. These components include a host aircraft 101 whose altitude is to be determined, an aircraft represented by the tactical military aircraft appearing in the FIG. 1 drawing. Signals used in accomplishing the altitude determination of the aircraft 101 are provided by one or more satellites of the global positioning system type, satellites such as are represented at 100 in FIG. 1. Signals provided by the satellite 100 are represented at 108 and 110 in FIG. 1 and are ultimately received at the two aircraft extremity-mounted antennas 104 and 106. Preferably these antennas 104 and 106 are disposed on top and bottom fuselage extremities of the aircraft 101 as indicated, however, other aircraft locations capable of receiving radio frequency signals from above and below the aircraft are possible. As indicated by the break lines at 112, the satellite 100 and the aircraft 101 are in reality separated by a much greater distance than would otherwise be understood from the FIG. 1 drawing, since satellite orbit altitudes in the range of 20,192 to 25,785 kilometers and aircraft altitudes under 30 kilometers, or 100,000 feet are most common. Such altitude or distance differences inherently result in the satellite signal paths, such as the paths represented in FIG. 1 at 108 and 110 for example, being essentially parallel when encountered at the aircraft 101. Additional details regarding the satellite 100 and its emitted signal characteristics are provided in the patents and other materials identified and incorporated by reference in later paragraphs of this document.

It is now well known in the art that signals, such as the signals 108 and 110, from a global positioning system satellite, e.g. the satellite 100, are capable of being processed to determine a satellite-to-receiver signal path length measurement. Such path length measurement capability is additionally discussed in, U.S. Pat. No. 5,187,485 titled "Passive Ranging Through Global Positioning System" (issued in the name of myself and a co-inventor colleague on Feb. 16, 1993). The U.S. Pat. No. 5,187,485 discloses two different propagation time-based arrangements for determining the distance between an aircraft and a target object. In addition to the aircraft and target position relationships present in the invention of the U.S. Pat. No. 5,187,485, the observer in this patent must know the direction of the target from the aircraft and must use a large high gain antenna to aim at the target during a range determination.

When compared with the invention of the U.S. Pat. No. 5,187,485 the present invention's use of two small, specifically disposed, fixed, broad beam antennas rather than a large directed antenna, its use of two parallel path signals from a satellite and its determination of a vertical distance between aircraft and ground appear to preclude a significant relationship with the invention of the U.S. Pat. No. 5,187, 485. These differences are considered significant even though both inventions make use of global positioning system signal illuminations in their operation.

Figure 2:
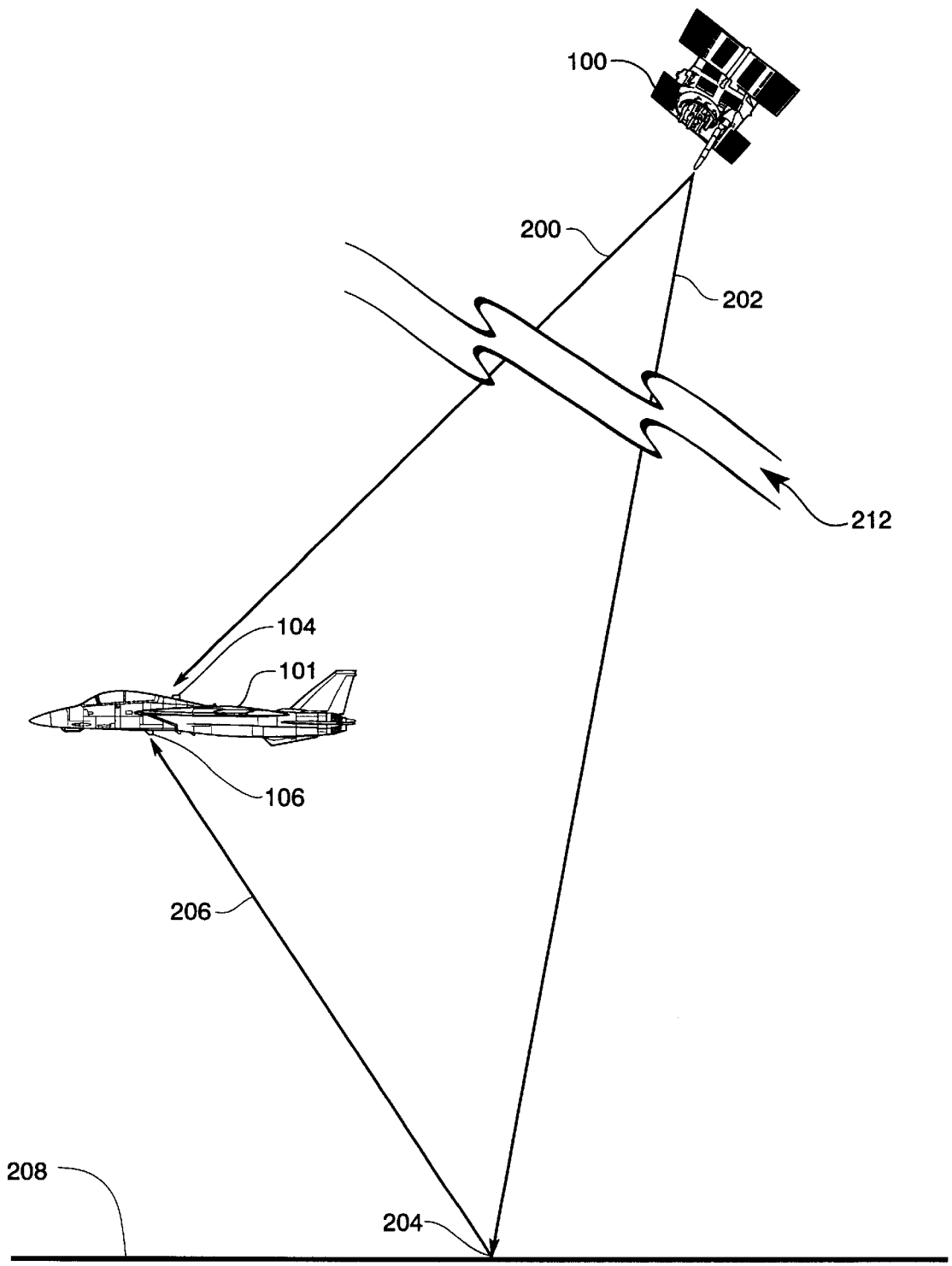
FIG. 2 shows a smaller scale representation of the FIG. 1 elements together with the signal paths relevant to the invention.

FIG. 2 in the drawings shows a differently scale representation of the FIG. 1 aircraft 101 and satellite 100 elements together with the direct and reflected satellite signal paths 200 and 202 relevant to the invention. The direct signal path 200 in FIG. 2 is represented to terminate in the upward facing antenna 104 of the aircraft 101 while the reflected signal path, 202, is shown to illuminate a point 204 located on the ground 208 somewhere below the aircraft 101. Signal reflections from this point 204 include a signal traveling along the path 206 to the bottom-mounted antenna 106 of aircraft 101. In view of the drawing-imposed close spacing between the satellite 100 and the aircraft 101 in the FIG. 2 view, the essentially parallel dispositions of the direct and reflected paths 200 and 202 are not well represented and the absence of representative spacing relationship in FIG. 2 is again indicated by the break lines at 212.

The signals emitted by satellite 100 in FIG. 1 and FIG. 2, the signals along each of the direct and reflected paths 200 and 202, are known in the art to be provided with right hand circular polarization. As may be somewhat less well known in the art, the signals reflected from the point 204 along the path 206 are altered in this polarization to being of a left hand circular polarization nature. See, for example, the textbook "Radar Cross Section" (Second Edition), by E. F. Knott, J. F. Shaeffer and M. T Tubey, Artech House Inc., 1993 at chapter 3, section 2, page 74 regarding this point. Although these polarizations are believed to be of secondary importance with respect to the present invention, they do influence one characteristic of the aircraft 101 antennas 104 and 106 used in receiving these signals. With the correct circular polarization characteristics present in these antennas, greater signal strength i.e., decreased transmission losses, is achievable for the satellite-to-aircraft signals and therefore more reliable and less interruptible operation of the altimeter and possibly greater polar region range of operation from the satellite are to be expected. In the "patch" antennas (of perhaps less than three inches in overall dimension) preferred for use in the antenna locations 104 and 106 of aircraft 101, such differences in signal circular polarization are often accommodated by altered locations of the antenna element to transmission line conductor node in the antenna configuration and tentatively through other physical feature distinctions in the antenna conductive element.

Figure 3:
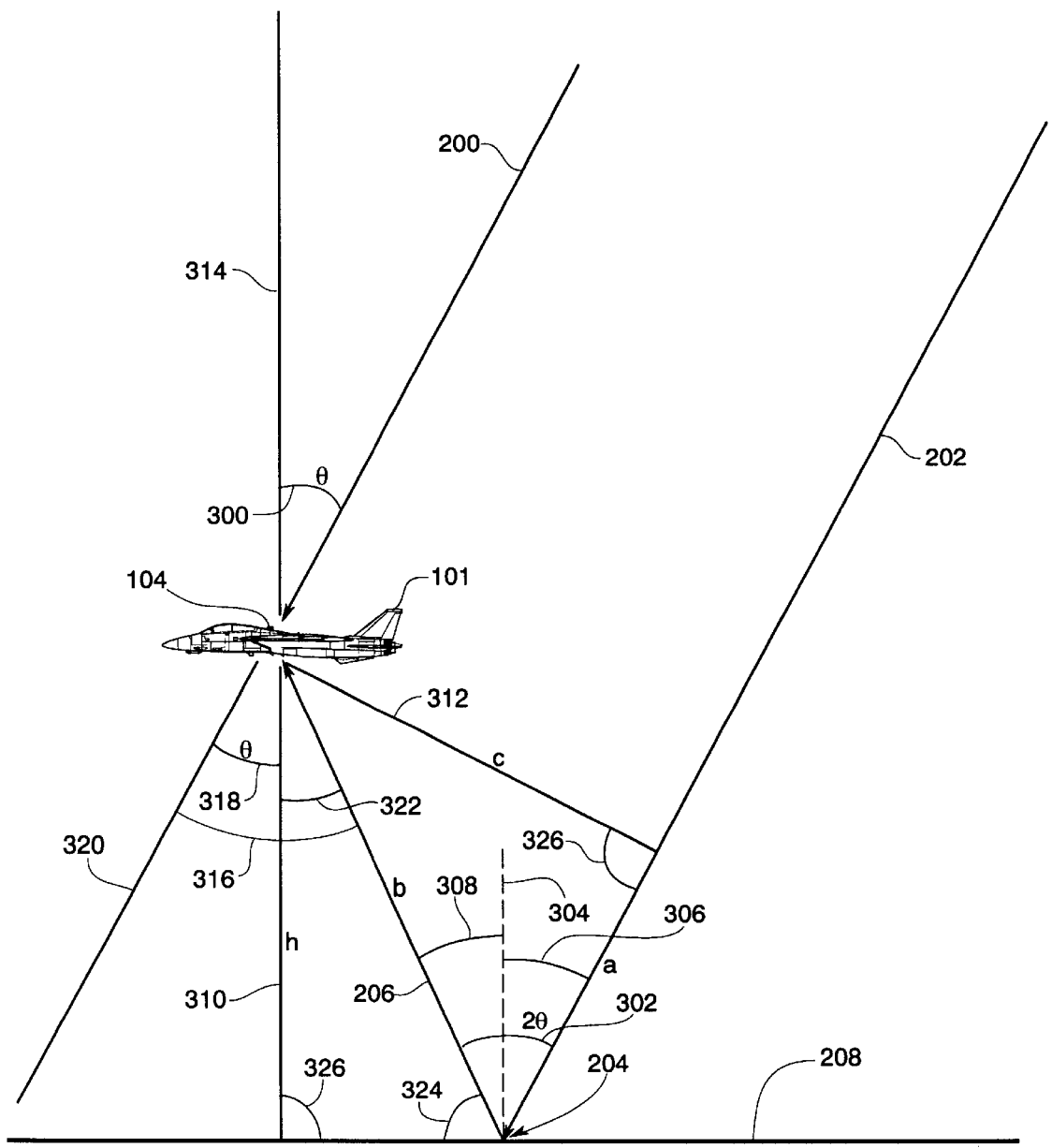
FIG. 3 shows an enlarged view of terminal portions of the FIG. 2 signal paths and several geometric/trigonometric constructions helpful in describing the invention.

FIG. 3 in the drawings shows an enlarged view of terminal portions of the FIG. 2 direct and reflected signal paths 200 and 202 and several geometric/trigonometric constructions helpful in describing the theoretical basis for use of signals from these paths in the present invention. This use is of course to determine the length of an aircraft altitude representation i.e., length of the path h at 310 in FIG. 3.

In the FIG. 3 drawing the direct signal path 200 is shown to arrive at the topmost antenna 104 of the aircraft 101 with an angle of arrival $\theta$ measured with respect to the vertical axis of a set of coordinate axes located at the aircraft 101. In the FIG. 3 drawing the indirect signal path 202 is shown to arrive at the bottom fuselage of the aircraft 101 after being reflected from the ground 208 at the point 204 and then continuing along path 206. The relative length of the two satellite-to-aircraft signal paths 200 and 202 can be measured through use of global positioning system signals because of the nature of these signals, as is known in the electronic/navigation art, and as may also be understood from the below incorporated by reference patents and other documents.

Relative distance can in fact be measured from the coarse/acquisition (C/A) code or the carrier frequency portions of the global positioning system signal. A C/A code distance measurement can provide a distance error measurable in a few meters of length and a carrier frequency based measurement can provide error measurable in centimeters. Accuracy of this latter degree may not be required by an altimeter however. A yet more accurate measurement arrangement is also vested in a third component of the global positioning system signals, i.e., in the P(y) code of the global positioning system. Since matters relating to this code are at the time of present application filing the subject of military security classification and this code is not believed necessary to obtain useful accuracy from the present system, discussion of this code and its use is omitted from the present document. For interested readers, however, certain basic discussion of this code and its use is contained in the below incorporated by reference patents and other documents and in additional materials available in the open literature and doubtless on the world wide web.

The position of a global positioning system satellite with respect to the earth is contained in its transmitted signal, thus, the position of the global positioning system satellite can be obtained from a global positioning system receiver. However, in the present invention altimeter, only the direction of the global positioning system satellite is needed, as may be appreciated from the equations below. In FIG. 3 the satellite is presumed to be disposed at an angle θ from the aircraft 101. The difference, d, between the direct signal path to the top antenna 104 and the reflected signal path to the bottom antenna 106 can be measured from the global positioning system signal and is considered in the equations 1–3 disclosed below. Before describing these equations, however, some discussion of a concept involved in the FIG. 3 signal paths appears warranted and a detailed definition of terms appearing in the FIG. 3 drawing is believed helpful.

It is well known in the technical arts that an optical beam received along, for example, the reflected path 202 in FIG. 3 will be reflected from a hypothetical mirror located at the point 204 in such manner as to make the angle of beam incidence (with respect to a normal to the mirror surface) equal to the angle of beam reflection. Such angles of incidence and reflection with respect to a normal line 304 are indicated at 306 and 308 respectively in the FIG. 3 drawing. (Such reflection characteristics are often demonstrated in the course of the classic Newtonian physics optical galvanometer demonstration, for example, wherein tilting of the galvanometer reflection mirror surface through an angle σ accomplishes a 2σ angular rotation of the galvanometer output beam.) It is also known in the electronic art that the equal angle of incidence and reflection concept in the optics field is duplicated in the case of a reflecting radar or other microwave spectrum signal - eg. in a reflection from the earth at point 204. See for example the textbook "Electromagnetic Waves and Radiating Systems" by E. C. Jordan, Prentice-Hall Inc., sixth printing, 1960, at chapter 5, section 5.09, pages 138 and 139 regarding this point. This equal incidence and reflection angle concept provides a basis for analysis of the FIG. 3 drawing and a measure of theoretical support for the present invention altitude determination.

Turning now to geometric/trigonometric relationships appearing in the FIG. 3 drawing, it may be determined by geometric reason that the angle 306 between the mirror-earth normal 304 and the reflected path 202 is equal to the angle θ, the angle of arrival of the direct path 200 signal. This follows from the parallel relationship between normal lines 304 and 314 and from the parallel relationship described above between indirect and reflected paths 200 and 202. Since the angles of incidence and reflection in the reflected path 202, the angles 306 and 308 in FIG. 3, are equal, as described in the previous paragraph, it follows that the angle 302 between incident and reflected paths 202 and 206 in FIG. 3 is of θ+θ or 2θ size.

Additionally in FIG. 3 it follows that the angle 316 between the path connecting the reflection point 204 and the aircraft 101 (the path 206) and an extension of the direct path 200 at 320 is also of 2θ size (since the path 206 forms a geometric "transversal" intercepting the two parallel lines of the paths 200 and 202). Moreover the angle 318 in FIG. 3 is equal to the angle 300 in size since the path 200 and the normal 314 are in fact intersecting straight lines. Therefore the angle 322 in FIG. 3 is also of θ size and the angle 324 must be of (90–θ) size since the angle 326 is a right angle.

With this knowledge of the angles 324 and 322 in mind, it is possible to consider the following mathematical equations which provide a usable mathematical expression for the aircraft altitude dimension h, at 310 in FIG. 3. In these equations the reflection path 206 is identified with the letter "b", the perpendicular between paths 200 and 202 with the letter "c" and the additional length of path 202, beyond the length of path 200, the length at 326, with the letter "a" all as are shown in the FIG. 3 drawing.

The total length difference, d, between the direct signal path to the top antenna 104 and he reflected signal path to the bottom antenna 106 can be measured in FIG. 3 as $$d = a + b \tag{1}$$

In the right triangle abc the distances a and b are related as $$a = b \cos 2\theta \tag{2}$$

Thus $$b(1 + \cos 2\theta) = d \text{ or}$$

$$b = \frac{d}{1 + \cos 2\theta}$$

Therefore once the distance b is found from the global positioning system signals, the desired altitude h can be obtained as $$h = b \sin(90 - \theta) = b \cos\theta = \frac{d \cos\theta}{1 + \cos 2\theta} \tag{3}$$

In equation (3) the latter fractional quantity provides a convenient expression for determining the desired altitude of the aircraft 101. This expression requires only knowledge of the angle of arrival of the satellite signal and the total difference in path 200 and 202 lengths as input signals to a software or hardware processor.

Theoretically therefore, the altitude of the aircraft 101 can be measured using signals from one global positioning system satellite. However, in general, there are several global positioning system satellites in view at any instant at any point on the earth. One can therefore use the altitude measurement results from multiple satellites to confirm or average the accomplished altitude determination and thereby improve the accuracy of the determination. The distance between the two antennas 104 and 106 on the aircraft 101 is known and can be calibrated out in the altitude measurement.

The present invention has been thusly described herein using references to the global positioning system or GPS system and with reference to the signals employed in this system. Although the existence of and the capability of this system and its provision of both high precision location information intended for military use and lower precision information usable at lesser expense for ordinary purposes is now well known in the art, additional information regarding this system is readily available. The U.S. Pat. No. 6,012,013 of one Paul McBurney, for example, provides an interesting and informative discussion of the (American Department of Defense-originated) global positioning system and of its Russian counterpart the Global Orbiting Navigation Satellite System, i.e., the GLONASS, in the text of columns 7 and 8 in the patent. In addition to this discussion the McBurney patent also identifies several publications, including specification-like and textbook publications, descriptive of these systems. The disclosure of the McBurney U.S. Pat. No. 6,012,013 and also the disclosure of the references identified in this patent are hereby incorporated by reference herein.

Another patent, U.S. Pat. No. 6,011,510 of D. M. Yee et al. is also informative with respect to technical details of the global positioning system, see the text in columns 3 and 4 of the patent, and is also hereby incorporated by reference herein. In a similar manner the disclosure of the prior patent of the present inventor and his colleague, i.e., U.S. Pat. No. 5,187,485 issued to James B. Y. Tsui and Rudy L. Shaw, is of interest as a global positioning system-based measurement system and is also incorporated by reference herein. In addition to these supplementations of the present disclosure, applicant intends that references to the global positioning system or GPS in this document be understood to be generic in nature and inclusive of the GLONASS system or other mapping and locating systems, for example, rather than be strictly interpreted.

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. In combination:
    a host aircraft having first and second global position system signal reception antennas disposed on opposite extremities thereof, said first and second antennas having direct signal and earth-reflected signal reception capabilities respectively with respect to radio frequency signals originating in a global position system satellite;
    radio frequency signal receiver apparatus connected with said first and second global position system signal reception antennas and generating output signals representing first and second samples of global position system data received from said global position system satellite via said first and second antennas respectively;
    signal processing apparatus connected with said radio frequency signal receiver apparatus and generating, from said first and second samples of global position system data, first distance signals representative of direct physical distance between said aircraft first global position system signal reception antenna and said satellite and second distance signals representative of greater ground reflection-inclusive indirect physical distance between said aircraft second global position system signal reception antenna and said satellite;
    said second distance signals representative of greater ground reflection-inclusive indirect physical distance between said aircraft second global position system signal reception antenna and said satellite including equal-angled incident and reflected signal paths to and from an earth point of satellite signal illumination attending said aircraft;
    geometric algorithm signal processing apparatus generating from said first and second distance signals and angular relationships attending said equal-angled incident and reflected signal paths an aircraft altitude signal representative of orthogonal distance between said aircraft and a ground point below said aircraft.

2. The combination apparatus of claim 1 wherein said first and second antennas are disposed on upper and lower fuselage portions of said aircraft.

3. The combination apparatus of claim 2 wherein said first and second antennas are patch antennas of differing physical configuration and of opposite received radio frequency signal circular polarization characteristics.

4. The combination apparatus of claim 2 wherein said radio frequency signals are of 1.57542 gigahertz frequency and said first and second antennas are of less than three centimeters overall physical dimension.

5. The combination apparatus of claim 1 wherein said apparatus includes satellite selection apparatus capable of selecting between concurrently receivable signals from a plurality of said global position system satellites.

6. The combination apparatus of claim 1 wherein said geometric algorithm signal processing apparatus includes trigonometric relationships definitive of a first right triangle having an angle formed by said equal-angled incident and reflected signal paths at said earth point as one angle therein.

7. The combination apparatus of claim 1 wherein said geometric algorithm signal processing apparatus includes trigonometric relationships definitive of a second right triangle having a coincident hypotenuse with said first right triangle and one angle equal to an angle of arrival of said radio frequency signals from said global position system satellite at said aircraft.

8. The combination apparatus of claim 7 wherein said geometric algorithm signal processing apparatus trigonometric relationships definitive of a second right triangle further include one second right triangle leg, a leg adjacent said angle equal to an angle of arrival of said radio frequency signals from said global position system satellite, a leg representing said aircraft altitude and another leg coincident with an earth surface portion below said aircraft.

9. The combination apparatus of claim 1 wherein said first and second antennas are disposed on upper and lower fuselage portions of said aircraft and said geometric algorithm signal processing apparatus includes trigonometric relationships definitive of first and second right triangles having a common side.

10. The passive method of generating altimeter data in an airborne aircraft comprising the steps of:
    collecting a first radio frequency signal from a direct signal path connecting said aircraft with a global position system satellite in-earth-orbit;
    receiving a second radio frequency signal from an indirect signal path connecting said aircraft with said global position system satellite in-earth-orbit by way of an intervening signal reflecting ground point;
    determining a path length difference between said direct and indirect signal paths;
    ascertaining from one of said radio frequency signals an angular orientation angle of said signal paths with respect to a coordinate axis at said aircraft;
    apportioning said path length difference among a pair of triangle sides formed by equal-angled incident and reflected signal paths located at said signal reflecting ground point;
    said triangle sides being components of a right triangle, a right triangle inclusive of one angle having a fixed size relationship with said signal path angular orientation angle;
    computing from geometric relationships attending said right triangle a length of a ground-perpendicular element connecting said aircraft with an underlying ground point, said computed length being an altitude determination of said aircraft.

11. The passive method of generating altimeter data in an airborne aircraft of claim 10 wherein said step of determining a path length difference between said direct and indirect signal paths includes computation of said path length difference from data encoded in said first and second radio frequency signals.

12. The passive method of generating altimeter data in an airborne aircraft of claim 10 wherein said intervening signal reflecting ground point is an earth disposed moving point below said aircraft and is displaced from said ground-perpendicular element aircraft-underlying ground point.

13. The passive method of generating altimeter data in an airborne aircraft of claim 10 wherein said step of ascertaining an angular orientation angle of said signal paths with respect to a coordinate axis at said aircraft comprises ascertaining said angular orientation with respect to said direct path first radio frequency signal and an axis normal of said aircraft in level flight.

14. The passive method of generating altimeter data in an airborne aircraft of claim 10 wherein said step of apportioning said path length difference among a pair of triangle sides includes:

forming said right triangle as a first right triangle having one apex at said aircraft; and with a right angle between said second signal path and a long first right triangle leg connecting with said apex; and with said apportioned path lengths being a short leg and hypotenuse portions of said first right triangle; and with an angle of said first right triangle opposite said long triangle leg being said one angle having a fixed size relationship with said signal path angular orientation angle; and with said fixed size relationship being a two times relationship with said signal path angular orientation angle.

15. The passive method of generating altimeter data in an airborne aircraft of claim 14 wherein said step of computing from geometric relationships attending said right triangle, said first right triangle, a length of a ground-perpendicular element connecting said aircraft with an underlying ground point includes:

computing a long leg length in a second right triangle having a common hypotenuse with said first right triangle;

said second right triangle including a right angle between a long leg representing said aircraft altitude and a short, ground-coincident, leg intermediate said perpendicular element ground point and said signal reflecting ground point.

16. The passive method of generating altimeter data in an airborne aircraft of claim 10 wherein said second radio frequency signal is a signal of 1.57542 gigahertz frequency and first circular polarization along a path of incidence with said signal reflecting ground point and second circular polarization along a path of departure from said signal reflecting ground point.

17. Aircraft altitude determination apparatus comprising the combination of:

aircraft-contained radio receiver means for receiving first and second radio frequency signals from an earth orbit-disposed global position system satellite, said second radio frequency signals being ground-reflected versions of said first signals;

geometric algorithm computation means for determining from an angle of arrival of said first and second radio frequency signals at said aircraft, from a length difference between signal paths traversed by said first and second radio frequency signals in reaching said aircraft and from an equal angled reflection of said ground reflected second signal at a ground point below said aircraft, an aircraft altitude-defining triangle leg length.

18. The aircraft altitude determination apparatus of claim 17 wherein said radio frequency receiver means includes:

one of first and second aircraft-mounted receiver antenna members and a two channel radio receiver and first and second aircraft-mounted receiver antenna members and a pair of single channel radio receivers; and wherein said first and second aircraft-mounted receiver antenna members are disposed on lower and upper parts of said aircraft.

19. The aircraft altitude determination apparatus of claim 17 wherein signal paths traversed by said first and second radio frequency signals in reaching said aircraft are radial but substantially parallel paths extending from a global position system satellite in orbit through earth atmosphere to upper and lower aircraft fuselage-mounted radio frequency antennas.

20. The aircraft altitude determination apparatus of claim 17 wherein said equal angled reflection of said ground reflected second signal includes a reflection angle, centered on an axis orthogonal of said reflection point, of twice said angle of arrival in size and wherein said ground-reflected second radio frequency signals are of opposite circular polarization with respect to said first radio frequency signals.

* * * * *